Figures 1, 2:
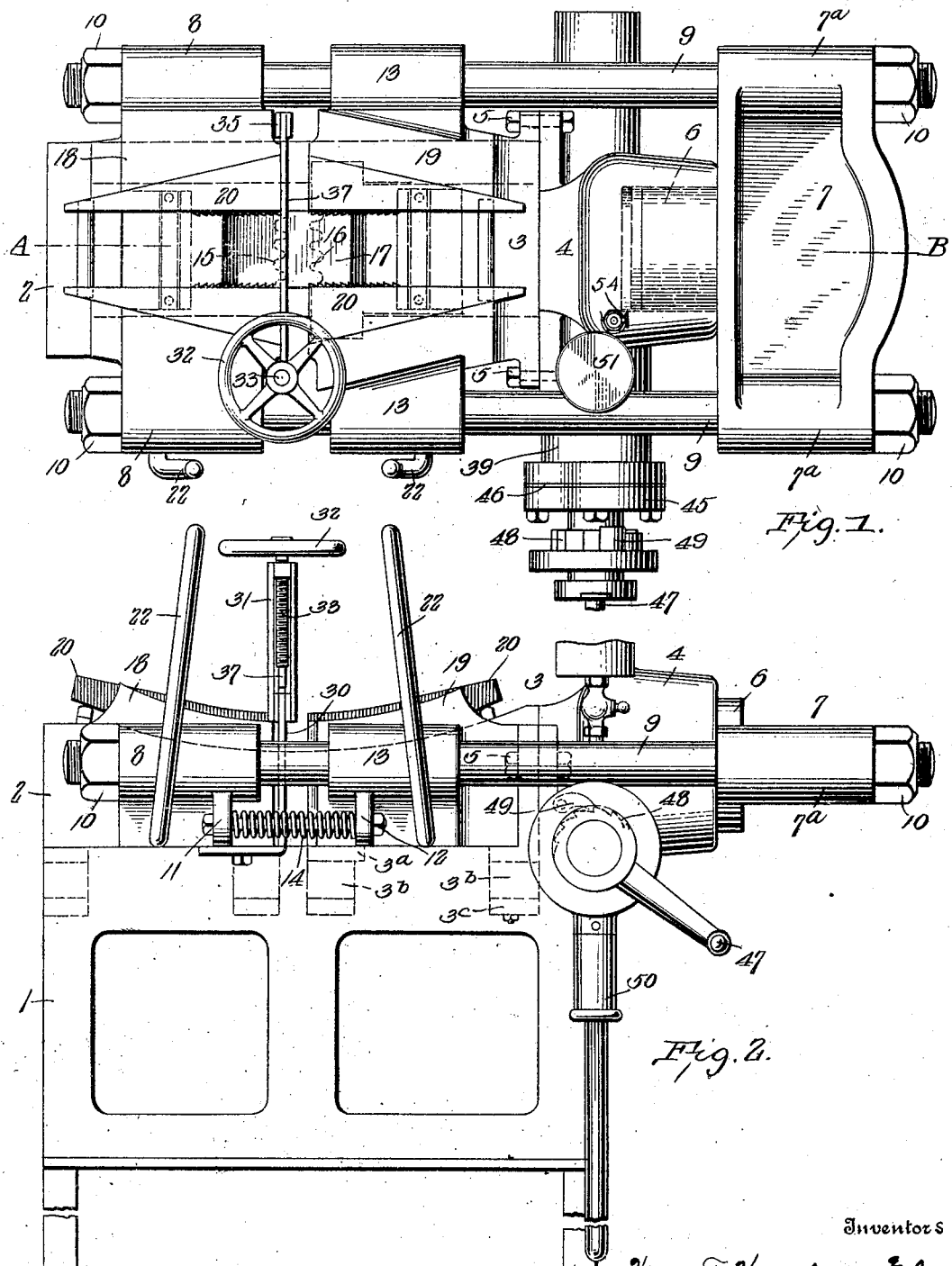

H. T. HENDERSON & H. M. LOURIE.
TIRE SETTING MACHINE.
APPLICATION FILED JAN. 17, 1906.

933,834.

Patented Sept. 14, 1909.
2 SHEETS—SHEET 1.

Witnesses

Inventors
Henry T. Henderson
Herbert M. Lourie
By Knight Bros
Attorney

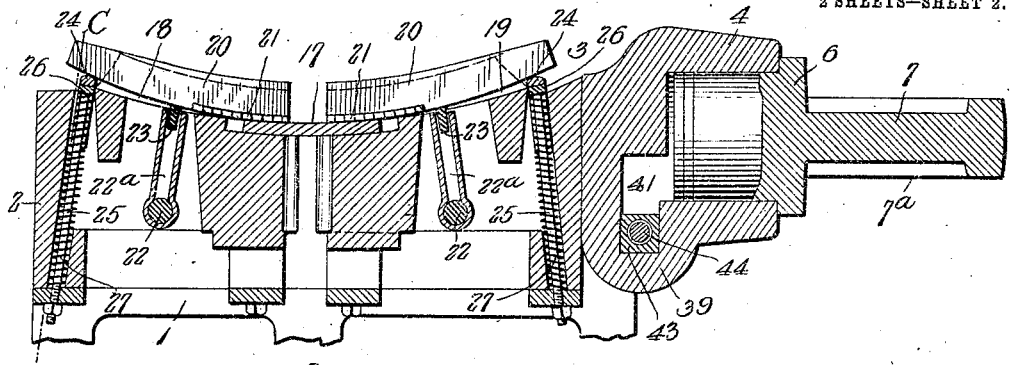

UNITED STATES PATENT OFFICE.

HENRY T. HENDERSON AND HERBERT M. LOURIE, OF KEOKUK, IOWA, ASSIGNORS, BY MESNE ASSIGNMENTS, TO NATIONAL HYDRAULIC TIRE SETTER COMPANY, OF KEOKUK, IOWA, A CORPORATION OF IOWA.

TIRE-SETTING MACHINE.

933,834.  Specification of Letters Patent.  Patented Sept. 14, 1909.

Application filed January 17, 1906. Serial No. 296,530.

*To all whom it may concern:*

Be it known that we, HENRY T. HENDERSON and HERBERT M. LOURIE, citizens of the United States, residing at Keokuk, in the county of Lee, State of Iowa, have invented certain new and useful Improvements in Tire-Setting Machines, of which the following is a specification.

The present invention relates to tire setters and in particular to the type of setters known in the art as edge grip tire setters.

The object of the invention is to so construct an edge grip tire setter that it can be operated by hydraulic pressure.

A further object is to provide improved means for adjusting the gripping blocks so as to conform to any shape and diameter of the wheel.

Other and further objects will appear in the following description and will be more particularly pointed out in the appended claims.

The invention is illustrated in the accompanying drawing, in which,

Figure 1 is a plan or top view of the machine. Fig. 2 is a side view. Fig. 3 is a section on line A—B, Fig. 1, Fig. 4 shows the hydraulic head and compression cylinder, Fig. 5 is a front view of the moving head block and its attachments, Fig. 6 is a section on line C—D, Fig. 3, Fig. 7 shows one of the gripping blocks in perspective, and Fig. 8 shows the displacer shaft.

1 is the frame which supports the gripping head blocks 2 and 3. The head block 3 is made stationary by lugs 3ª fitting into a recess in the frame, lugs 3ᵇ projecting downward to hold the block in proper position, and the block being held down on the frame by means of bolts passing through a suitable clamp plate 3ᶜ. The head block 2 is slidably mounted on the frame by means of downwardly projecting lugs 2ª (see Fig. 5) which are guided by the top of the frame, and to hold the block down on the frame, clamp plates 2ᵇ are bolted across the lugs to engage the under surface of the frame.

A hydraulic cylinder 4 is arranged at the outer end of the stationary head block 3 and secured to the block by means of bolts 5. Within the cylinder is a properly packed piston 6 to which is cast a cross head 7.

On each side of the head block 2 are sleeves 8 and on each side of the cross head 7 are sleeves 7ª. Rods 9 pass through the sleeves 8 and 7ª and nuts 10 on the ends of the rods 9 serve to hold the head block 2 at variable distance from the cross head, the rods 9 passing loosely through sleeves 13 provided on the stationary head blocks 3. A suitable spring 14 which abuts against lugs 11 and 12 on the head blocks 2 and 3 tends to hold the blocks apart. Each of the blocks is provided with teeth or corrugations 15 and 16 at their central inner end (see Fig. 1) to enter into engagement with each other and hold the blocks from relative lateral movement when the block 2 is moved toward the block 3. Each block is recessed at its inner end to allow a small metal plate 17 to be placed on the blocks for the tire to rest on while being set.

To allow metal bands or tires of varying size to be grasped firmly by the machine, the head blocks are provided with upper projecting jaws 18 and 19 having their inner surface extending at an angle to the line A—B in Fig. 1.

20 are wedge-shaped gripping blocks which are inserted between the jaws in such a manner that the tire will be firmly gripped by the gripping blocks and the grip increased as the pressure increases. To make the grip more secure, the gripping blocks are provided at their lower side with toothed steel plates 21 to engage the tire to be upset.

In a machine of this character, it is very important to have the gripping blocks placed evenly on the sides of the tire, so that the gripping block will not be ahead of the one on the opposite side. To accomplish this result, the head blocks are cored out to receive levers 22 provided with jaws 22ª which engage with pins 23 on the under side of the gripping blocks, one lever 22 being provided for each pair of gripping blocks as shown in Fig. 1. By means of the levers 22, the gripping blocks are thrown against the tire or away from the tire as the operator may desire and the operation is quickly done, and the grips set evenly. To adjust the gripping blocks 20 so that they will engage tires on small or large diameter wheels each of the head blocks is cored out to receive a regulating device consisting of a plate 24 engaging the rear end of the gripping blocks, a stem 25 provided with a U-shaped plate 26 on which the plate 24 rests, and a spring 27 surrounding the stem and abutting against the plate 26 and a plate 28 secured to the under face of the head block. By means of a nut 29 on the lower screw threaded end of the stem 25, the regulating device is held down against the action of the spring. When a wheel is placed on the machine, the tire strikes the plate 24 and pushes the entire regulating device downwardly against the action of the spring 27, the movement being greater or less according to the diameter of the wheel, and as the gripping blocks 20 rest on the plate 24, the gripping blocks become automatically adjusted to conform to the periphery of the wheel.

30 and 34 (see Fig. 5) are two wrought posts which are arranged on each side of the machine. To the post 30 is hinged a wrought holder 31 having its top tapped to receive a screw 33 which is operated by a hand-wheel 32. Extending upwardly from the post 34 is a double post 35 with bolts or pins 36 placed at intervals as indicated in Fig. 5. Through the holder 31 is placed a lever 37, one end of which can be placed in the post 35 to engage any one of the pins 36.

38 is a wooden or metal piece that slides on the lever 37. When a wheel is placed in the machine, the block 38 is made to press on the inside of the felly or against a suitable block placed on the felly and heavy pressure can be easily and quickly applied to hold the wheel down in the machine by means of the lever 37, one end of which is held under the pins in the post 35, while the other end is forced down by means of the screw 33 operated by the wheel 32. The lever 37 is adjustable for any thickness of felly as indicated in full lines and dotted lines in Fig. 5.

39 is a displacer cylinder which communicates with the cylinder 4 through the passage 41. In the cylinder 39 works a plunger 42 which on its inner end is provided with a screw 44 that works in a nut 43 which is held from rotation in the cylinder 39.

45 is a clamping ring which holds a flanged packing 46 in place.

The displacer is forced or turned in by means of a crank 47. A ratchet mechanism 48, 49 and 50 is provided and used when heavy pressure is required.

A tank 51 containing suitable liquid communicates with the cylinder 39 by means of a pipe 52 which is provided with a stop cock 53. An air cock 54 is arranged on the cylinder 4 to let out any air that may have accumulated in the cylinder.

The operation of the machine is as follows: The plunger 42 is turned outwardly by means of the crank 47 to the position shown in dotted lines in Fig. 4. The stop cock 53 and the air cock 54 are thereupon opened and liquid passes from the tank 51 into the cylinder 39 and through the passage 41 into the cylinder 4. When liquid begins to run out through the air cock 54, the two cocks are closed. The wheel is placed on the plate 47 and the gripping blocks 20 are adjusted by means of the lever 22 until the teeth 21 firmly grip the edge of the tire. The pressure of the wheel on the plates 24 automatically adjust the gripping blocks to conform to the periphery of the wheel. The wheel is thereupon secured in place by means of the block 38, the lever 37 and the screw 33. Finally, the plunger is turned inwardly by means of the crank 47 and the ratchet mechanism and the pressure of the fluid forces the piston 6 outwardly and due to the connection between the cross head 7 and the head block 2, the movable head block 2 with its gripping blocks is forced toward the stationary head block 3, until the tire, which is held by the gripping blocks 20, is shrunk. To liberate the wheel after the tire is shrunk, the stop cock 53 is opened and the pressure will go off to permit the spring 14 to return the head block 2 to its normal position.

The machine is very effective for upsetting or shortening cold metal tires for vehicle wheels without removing the tire from the wheel, but it is evident that it can also be used to advantage for upsetting metal of any kind, hot or cold.

Any suitable hydraulic pump may be used instead of the displacer.

Having now described our invention, what we claim as new is:—

1. In a tire setter, the combination of gripping blocks provided with means for engaging the edge of the tire, and an elastically yielding support for said blocks adapted to be engaged by the tire to adjust the blocks to conform to the curvature of the tire.

2. In a tire setter, the combination of gripping blocks provided with means for engaging the edge of the tire, and means for yieldingly supporting the blocks to conform to the curvature of the tire; said means comprising a yielding support on which said blocks rest and adapted to be engaged by the tire.

3. In a tire setter, the combination of gripping blocks provided with means for engaging the edge of the tire, and a plate on which the blocks rest with their rear ends; said plate being yieldingly supported and adapted to be depressed by the tire to adjust the blocks to the curvature of the tire.

4. In a tire setter, a plurality of gripping blocks for gripping the edge of the tire, and an elastically yielding support for said gripping blocks whereby they are adapted to adjust themselves vertically to conform to the curvature of the tire.

5. In a tire setter, the combination of a frame, a stationary head block secured thereon, a second head block movable on the frame, gripping blocks movable in said head blocks, a hydraulic press mounted upon the frame and provided with a piston rigidly connected with the movable head block, means for moving each pair of gripping blocks in unison and relatively to their respective head blocks, and means adjacent to said means for moving the gripping blocks whereby fluid is forced into said hydraulic press to impart movement to said head blocks.

6. In a tire setter, the combination of a stationary head block, a movable head block, gripping blocks adjustably mounted in each head block to automatically grip the tire, a hydraulic press having a piston rigidly secured to said movable head block, whereby the movable head block is moved relatively to the stationary head block, and a rotary plunger for forcing fluid into said press, said plunger being provided with a handle for operating the same.

7. In a tire setter, the combination with the stationary and movable head blocks each provided with gripping blocks; of a hydraulic press having its axis longitudinally of the machine, a plunger therefor operatively connected with the movable head block; a fluid pressure cylinder connected with said press and extending transversely of the machine between the press and the stationary head block; and a plunger within said cylinder, said plunger being provided with means for moving it by small degrees into and out of the cylinder.

The foregoing specification signed at Keokuk Iowa, this tenth day of January, 1906.

HENRY T. HENDERSON.
HERBERT M. LOURIE.

In presence of two witnesses:
MARGARET C. KEPPEL.
PAUL L. DYSART.